May 22, 1951 J. H. ROUSE 2,554,347

GUIDE DISK FOR MAGNETIC RECORDING AND REPRODUCING DEVICES

Filed Nov. 26, 1947 4 Sheets-Sheet 1

INVENTOR
J. H. ROUSE
BY [signature]
ATTORNEY

May 22, 1951 J. H. ROUSE 2,554,347

GUIDE DISK FOR MAGNETIC RECORDING AND REPRODUCING DEVICES

Filed Nov. 26, 1947 4 Sheets-Sheet 2

INVENTOR
J. H. ROUSE
BY [signature]
ATTORNEY

May 22, 1951 J. H. ROUSE 2,554,347

GUIDE DISK FOR MAGNETIC RECORDING AND REPRODUCING DEVICES

Filed Nov. 26, 1947 4 Sheets-Sheet 3

INVENTOR.
J. H. ROUSE

BY [signature]

ATTORNEY

May 22, 1951 J. H. ROUSE 2,554,347

GUIDE DISK FOR MAGNETIC RECORDING AND REPRODUCING DEVICES

Filed Nov. 26, 1947 4 Sheets-Sheet 4

INVENTOR.
J. H. ROUSE

BY A. D. Pineles

ATTORNEY

Patented May 22, 1951 2,554,347

UNITED STATES PATENT OFFICE 2,554,347

GUIDE DISK FOR MAGNETIC RECORDING AND REPRODUCING DEVICES

John H. Rouse, Los Angeles, Calif., assignor to The Brush Development Company, Cleveland, Ohio, a corporation of Ohio Application November 26, 1947, Serial No. 788,255

1 Claim. (Cl. 274—41.4)

This invention relates to guide disc for magnetic and reproducing device, in which magnetic signals are recorded and reproduced by a magnetic flux interlinkage between windings of a magnetic record transducer head and relatively moving elements of a magnetic recording medium engaging the pole faces of the transducer head.

The present invention is directed to magnetic recording systems of the foregoing type, using a magnetic recording medium having an extended magnetic record surface on which signals are magnetically recorded along a succession of interconnected, continuous adjacent record traces which are tangibly indistinguishable along the record surface. Such recording medium may be formed, for instance, by a thin limp generally flat record sheet member, similar to phonograph disc records, having an exposed endless generally circular magnetic record surface on which magnetic records are recorded along adjacent spiral record traces which are tangibly indistinguishable along the record surface.

Among the objects of the invention is a recording system in which a transducing guide structure having continuous guide tracks, such as a generally spiral groove is detachably combined with a magnetic record structure of the foregoing type so that the guide structure and the limp record structure may be manipulated as a unit for simple mounting on and dismounting from a rotatable record support and, when mounted, is rotated by the support for the guiding of a record transducing unit by the guide track so that it is magnetically linked with successive elements of the record sheet structure along a path corresponding to the guide track.

The foregoing and other objects of the invention will be best understood from the following description of exemplifications thereof, reference being had to the accompanying drawings wherein Fig. 1 is a plan view of a magnetic record transducing system according to the invention;

Figs. 2 and 3 are sectional views taken along lines 2—2 and 3—3, respectively, of the magnetic record transducing system of Fig. 1;

Figure 1:
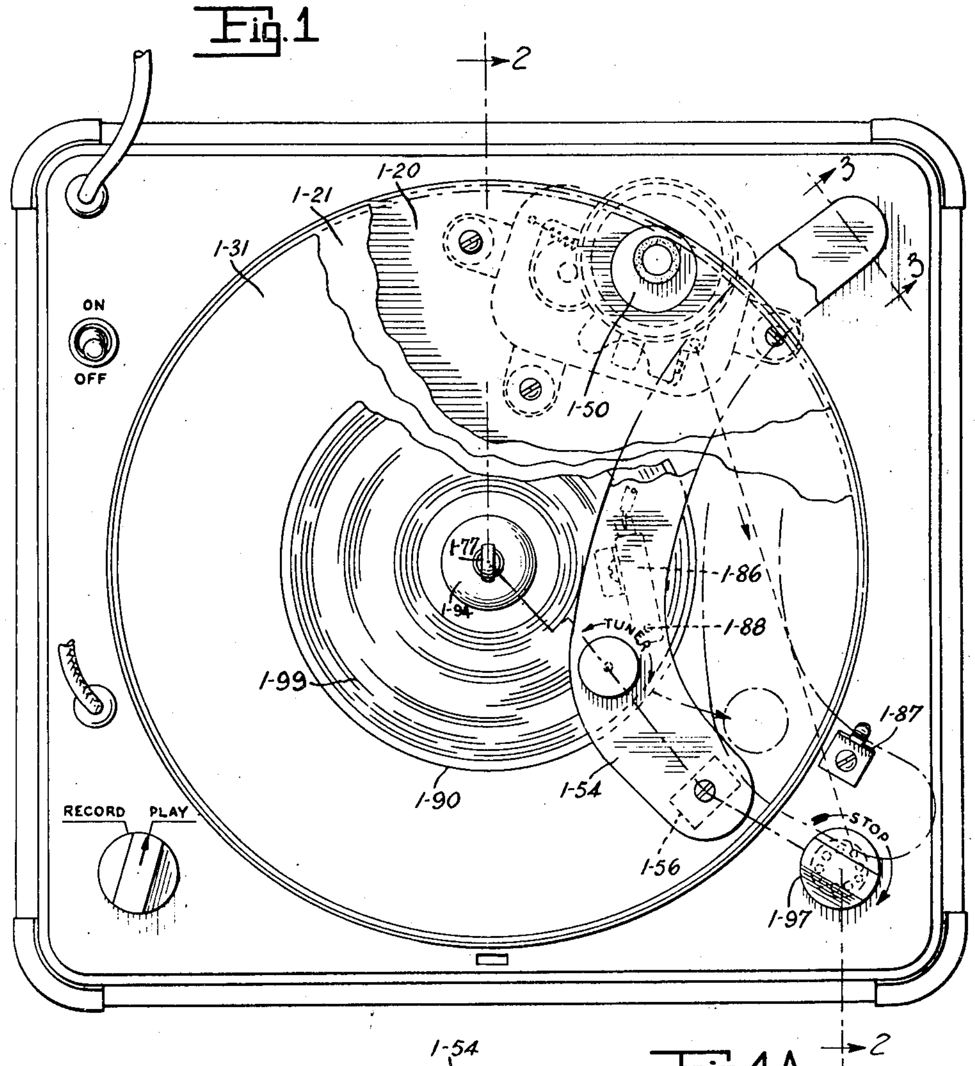
Figure 3:
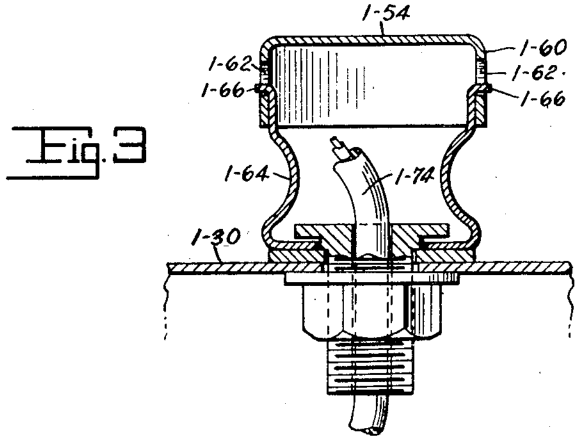
Figure 4A:
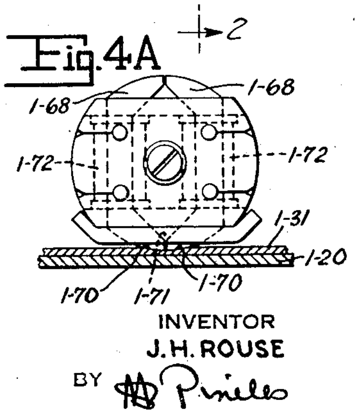
Figs. 4 and 4A are detail sectional views of the transducer of Figs. 1 and 2 taken along the lines 4—4 and 4A—4A of Fig. 2.

Fig. 1 illustrates one practical form of magnetic record transducing system embodying the invention. This transducer includes a rotatably mounted record member holder in the form of a table 1—20 having a central bearing support 1—22 held in place in a generally box-like housing 1—24. As shown, the bearing support 1—22 is held in a bearing socket 1—26 having a collar 1—28 and clamped to the upper surface 1—30 of the housing by the spring friction grips 1—32. The bearing support 1—22 is shown as including a lower cylindrical extension 1—34 fitting within the socket 1—26 and held against removal by a spring retainer 1—36 engaging in a slot 1—38.

The rotatably mounted table 1—20, which is quite similar to the conventional phonograph turntable, may have a depending rim 1—40 for engagement and operation by driving means shown in the form of an A. C. induction motor 1—42. The rim drive is established through the step-down friction drive including the roller 1—44 held on a slidable shaft 1—45 together with the rim engaging roller 1—48 and directly driven by the motor shaft 1—46 against which it is held in contact as by suitable bias means such as a spring 1—47. The passageway 1—50 in the housing cover 1—30 receives the slidable drive shaft 1—45. The rollers 144 and 148 are provided with resilient sleeves or tires 141 and 143 to smoothly supply power and prevent the transmission of vibrations through the drive to the turntable.

Pivotally mounted on the upper surface of the housing beside the turntable indicated at 1—20 there is shown a transducing arm 1—54 which holds a magnetic transducing head 1—56. The arm 1—54 is shown in the shape of an inverted channel having an upper wall 1—58 the ends of which are bent downwardly to provide side walls 1—60. The arm 1—54 is loosely held pivoted around a horizontal axis by openings 1—62 in the side walls 1—60 which fit over and are engaged by the ends of a generally U-shaped clip 1—64 which are bent over to form generally horizontal detents 1—66 projecting through the openings 1—62. The clip 1—64 is in turn pivotally held to the top of the housing so as to be rotatable around a vertical axis.

The transducing head 1—56 includes pole pieces 1—68, shown as formed of magnetic sheet material aligned and shaped so that their lower edges form smoothly rounded pole faces 1—70 separated by a small non-magnetic gap 1—71. Windings 1—72 surrounding the pole pieces are connected to the transducing amplifiers, which may be contained within the housing 1—24, by means of the shielded cable 1—74 fitted within the channel of arm 1—54 and passing through the bottom of clip 1—64 and through the top of the housing 1—30.

The transducing arm 1—54 which in plan view is curved, as indicated in Fig. 1, has affixed thereto in its intermediate portion a guide pin 1—76 rotatably mounted in a pin socket 1—78 which is anchored to the upper wall 1—58 of the arm. The upper end of the guide pin 1—76 projects above the arm and is enlarged to form a manually rotatable head 1—80, and the pin is held in place by a split spring ring 1—82 fitted in a peripheral slot 1—84 in the body portion of the guide 1—76.

The arm openings 1—62 are shaped to loosely receive the clip detents 1—66 thereby permitting some turning of the transducing arm 1—54 around its longitudinal axis with respect to the housing and turntable in addition to the tilting of the arm 1—54 around the horizontal axis defined by the detents.

In the form shown, the arm may also hold switch means shown as micro-switch 1—86 suitably held and having a vertically movable sensing member 1—88 projecting below the arm, as shown.

Figures 2, 4, 5:
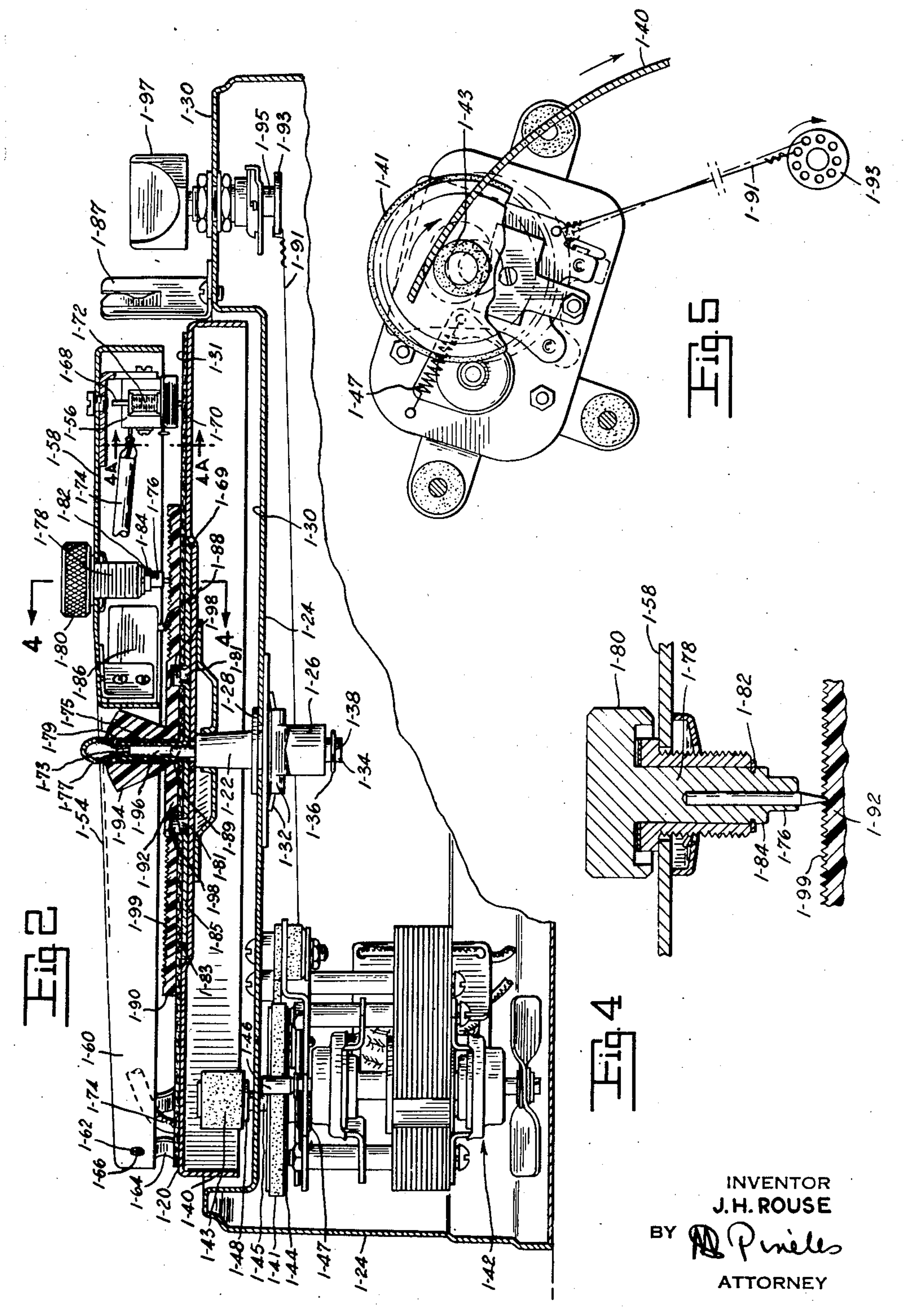
Fig. 5 is a partial top view of the transducer drive with the top of the housing removed and the turntable partially shown in section.

The turntable 1—20 may have its upper surface covered with a layer of friction material such as flock 1—21 in a manner similar to conventional phonograph tables. The record track on which recordings are transduced is shown at Figure 2 as a limp disc-like sheet structure 1—31 having upwardly exposed along at least one of its faces a permanently magnetizable stratum. One suitable form of such record sheet structure is a thin paper disc having a uniformly distributed finely divided permanently magnetizable power, as described in the co-pending Kornei applications, S. N. 685,092 and S. N. 685,093 filed July 20, 1946 (which latter application has been abandoned), and S. N. 762,463 now Patent No. 2,547,948, issued April 10, 1951 and S. N. 762,464 filed July 21, 1947. The paper sheet may have an overall thickness of about 2 mils so that it can easily be stored in a minimum of space. However, the lack of rigidity characteristic of such record members makes them awkward to handle sometimes. Thus, for example, when the record sheet member is mounted on the transducing turntable of the construction of Figure 2, it must be relatively carefully handled, properly aligned and provided with suitable driving engagement for substantially no slip rotation. Alignment and driving engagement may easily be provided by an upwardly extending pin secured to the turntable 1—20 and a correspondingly located perforation in the record number through which the pin projects. This arrangement further complicates a record applying or removing step because the record must be engaged with the driving and aligning pin as well as with another engaging surface such as the central pivot pin 1—89.

As shown in Figures 1 and 2 the magnetic transducing head 1—56 is guided along a generally spiral path over the record sheet member 1—31 by the guide structure 1—90 placed over the record member 1—31. This guide structure 1—90 must accordingly be removed each time it is desired to replace a record member and must be remounted each time a transducing operation is performed.

According to the invention these difficulties are avoided by providing the apparatus with a record retaining member 1—85 arranged for detachable engagement with the guide structure 1—90 to hold the record member 1—31 so that it can be conveniently and easily mounted or removed from the turntable when desired. In the form of the invention shown at Figure 2 the retaining member includes a generally disc-like portion 1—83 having a central upwardly extending boss 1—96 and at least one upwardly projecting aligning pin 1—81. The guide structure 1—90 is shown as provided with a centrally positioned grip-knob 1—94 which may be formed as an integral portion thereof or cemented thereto so as to form a convenient manipulating surface by which the guide structure can be easily removed or applied, as desired. It also has a generally sheetlike body portion 1—92 and an exposed surface which contains the guide track groove 1—99 generally spirally arranged. The grip-knob 1—94 is shown as provided with a central bore 1—79 for receiving and latching engagement with the central boss 1—96 of the retaining plate. The body portion 1—92 of the guide structure also contains sockets 1—98 for receiving the aligning pins 1—81. One or more of the upwardly projecting engaging elements of the retaining plate 1—85 may be formed as a detachable latching element by which it is detachably held to the guide structure 1—90. In the construction of Figure 2 the central boss 1—96 may have an upper portion bulged or bowed out as shown at 1—77 and of resilient construction so that it may engage against the upper portions of the bore 1—79 effectively holding the retaining plate and the guide disc together. At the same time by merely pushing downwardly on the central boss 1—79 with respect to the grip-knob 1—94, as by holding the grip-knob between the first and second fingers of the hand and pushing downwardly on the enlarged head 1—77 with the thumb, the members may be readily separated. The bore 1—79 may be slightly enlarged at its lower portions as indicated at 1—75, so that when the enlarged head 1—77 is pushed down below the top of the grip-knob 1—94, it will be relatively free to move through the lower portions of the bore. The record sheet 1—31 is provided with openings corresponding to the locations of the pins 1—81, as well as boss 1—96, so that it may be held between the retaining plate 1—85 and the guide disc 1—90.

Figure 6:
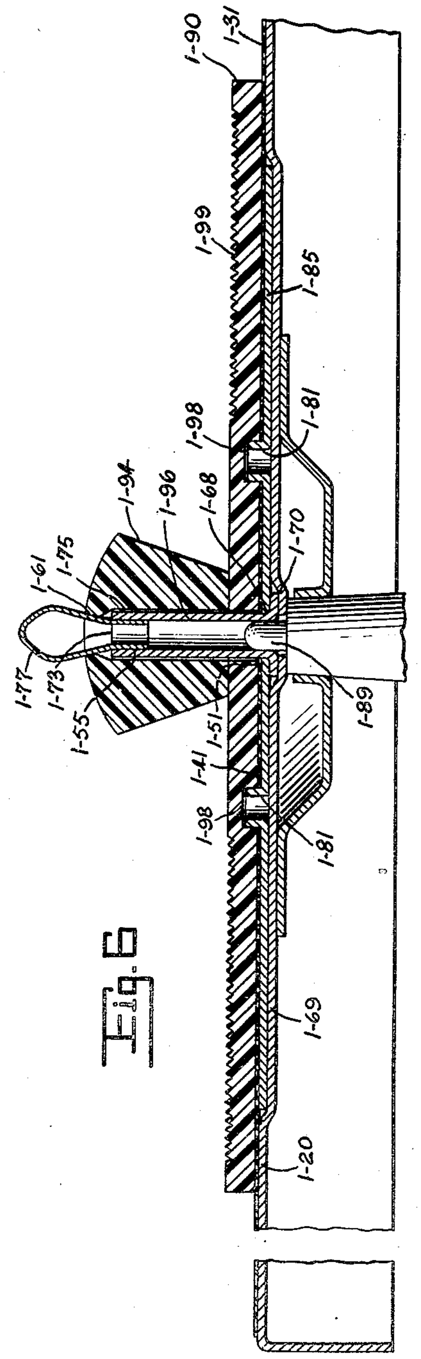
Fig. 6 is a sectional detail view similar to Fig. 2.

The unitary record sheet holding structure of Fig. 2 is merely illustrative of the general features of the invention and the details of this form are more clearly shown in Fig. 6. The grip-knob of plastic composition is shown as cemented on to the guide track containing sheet 1—90, also plastic, and having a central opening aligned with the grip-knob bore. The aligning pins 1—81 of the retaining member 1—85 are shown as punched through to provide relatively straight accurately alignable side walls. The pins 1—81 may be unsymmetrically placed on the retaining sheet so that alignment is only possible with a single relative position between the members. A single-off-center aligning pin may be used preferably as far from the control base as possible. The central boss portion 1—96 of the retaining member 1—85 may be of generally tubular shape with the upper end 1—73 receiving a generally U-shaped catch spring 1—77 biased to the expanded position shown and of sufficient resiliency to securely hold the unit together. The spring 1—77 may be formed of flat sheet so that it occupies a generally rectangular portion of the upper regions 1—61 of the bore and assists in aligning the track member with the retaining member by shaping the upper portions of the bore 1—79 so that they are also of corresponding rectangular outline. A friction fit is sufficient to hold the catch spring 1—77 and the boss 1—96 together, but welding, soldering or riveting may also be used if desired.

For transducing a recording the record sheet 1—31 held in the mounting unit formed by the guide-disc 1—90 and the retaining plate 1—85 is placed on a turntable so that the central boss 1—96 fits over the pivot pin 1—89 and at the same time the retaining plate and the record sheet contact the turntable surface. The central region of the turntable surface may be recessed as shown at 1—69 so that when the record sheet holding unit is placed in position, the lower face of the retaining plate 1—85 frictionally engages a relatively large portion of the turntable surface. Enough frictional contact is thereby provided for substantially no-slip driving connection between the turntable and the record sheet 1—31 even in the absence of an interlocking pin and socket connection. In the construction of Figure 2 guide disc 1—90 may be of larger diameter than the retaining plate 1—85 so that the peripheral portions of the guide disc also keep the record sheet engaged with the turntable surface for at least a short distance beyond the periphery of the retaining plate. In this annular portion between the edge of the retaining plate and the end of the guide disc the turntable surface may be provided with a pin for engagement in a socket in the guide disc through an additional perforation in the record track so that the apparatus may be used interchangeably either with the record sheet holding the construction shown or with a simple record sheet and guide structure 1—90 without the holding features of the retaining plate. In this form of the invention it is unnecessary to provide a separate guide disc and retaining plate for each individual record that is to be transduced and the unitary holding structure need only be utilized when it is desired to rapidly change record members as, for example, when making a recording too long to be contained on a single record member.

After the record sheet and guide disc combination are mounted in place the arm 1—54 is brought into engagement with them by manually placing it so that the pole faces 1—70 of the magnetic head 1—56 contact the upper surface of the record member while the lower end of the guide pin 1—76 engages and fits in a portion of the guide groove 1—99. Actuation of the rim drive will then cause the turntable to rotate and carry with it the record member 1—31 and guide disc 1—90 while the guide pin 1—76 causes the transducing arm 1—54 to be fed in a generally radial direction with respect to the turntable, pivoting around a vertical axis at 1—20. The guide groove 1—99 may be so arranged that the feeding movement of the arm is outwardly from the center of the guide disc so that the pole faces of the magnetic core 1—56 scan the upper surface of the record member 1—31 along a generally spiral scanning track.

To ensure the proper aligning of the scanning trace of the record member with the actual position of a recording thereon, the guide pin 1—76 may have its lowermost point eccentrically positioned so that manual rotation of the head 1—80 can be used to adjust the position of the pole faces with respect to the guide groove 1—99 and also with respect to the surface of the record member 1—31.

The switch 1—86 is shown as so mounted that its sensing element 1—88, which is downwardly biased, is held up in the switch closing position shown in Fig. 2 during transducing operation by the upper surface of the guide disc 1—90. However, when the transducing is completed and the transducing arm 1—54 is in its outermost position, the sensing member is moved far enough so that it projects beyond the outer edge of the guide disc so that the sensing element 1—88 is free to move downwardly and open the switch. The switch may be connected to stop the rim drive as by opening the supply circuit to the driving motor 1—42.

Manually operable means may also be provided for interrupting the rim drive when desired. As shown, this control may be in the form of a knob 1—97 rotatably mounted on a shaft 1—95 pivotally held on the upper wall 1—30 of the housing and having a flange 1—93 connected as by link 1—91 to the slidable holder of the movable shaft 1—45. An arm rest shown in the form of a clip 1—87 is mounted to receive and grippingly engage a side wall 1—60 of the tone arm when retracted into the position shown in the dot-dash lines in Fig. 1.

According to the invention, the record supporting units may be prepared with individual sandwiched record sheets and as a new record sheet is needed, the assembled unit is mounted on the turntable, removing any previously mounted unit. The changing of the records is a very simple operation requiring only the lifting of one unit from the turntable and the lowering of the substitute in place. In those forms in which an off-center aligning pin is provided on the turntable, the replaced record-holding unit is merely oriented so that a corresponding off-center aligning socket fits over and receives the aligning pin. Without the turntable aligning feature, the record-containing unit is placed in any position, the alignment of the record sheet with the guide track being provided by the aligning means in the supporting structure itself.

The record-containing holding units may be assembled beforehand in quantity with fresh record sheets and a new one is used as needed with very little loss of time. Thus in a busy office where lengthy messages are recorded for conversion into typewritten form, as in dictation, a set of the individual record holder units may be assembled with record sheets each morning, and used as desired.

Transducing operations are initiated by mounting the record member 1—31 in place, as indicated above, and then lifting and carrying the free end of the transducer arm 1—54 inwardly towards the center of the turntable until it engages the knob 1—94 of the guide disc and further inward motion is prevented. This knob 1—94 is so shaped that it acts as a stop for the transducing arm and automatically determines the portion of the record member engaged by the pole faces 1—70 of the transducing core for the commencement of the transducing operation. After bringing the transducing arm over as far as the knob will permit, the free end of the arm is lowered to bring the pole faces into engagement with the record member. The loose pivoting of the transducing arm at the clip automatically permits the arm to longitudinally tilt and adjust itself so that the lower end of the guide pin 1—76 also rests against the upper surface of the guide disc 1—90. The weight of the transducing arm and its attached openings is so distributed and the loosely held pivotal connection at the clip detents 1—62 is so adjusted that the lower end of the pin is held against the upper surface of the guide disc by a force sufficient to assure the proper guiding of the pin along the spiral guide channel 1—99, while at the same time the pole faces of the transducing core 1—56 are held against the record member by a small force, of the order of several grams, sufficient to establish effective magnetic interlinkage with the record track. Additionally, the yieldable layer 1—21 together with the loose pivoting of the transducer arm are arranged to permit a yieldable flexing of the record member 1—31 where it is engaged by the pole faces 1—70 by the small contacting force so that the convex pole faces are engaged along an elongated portion with a record track. This yieldable contact feature assures positive interlinkage with the diminutive non-magnetic gap of the pole faces in spite of minor variations in the exact positioning of this gap with respect to the record track, as more fully explained in the Begun application, Serial No. 612,728 filed August 27, 1945, which issued as Patent 2,535,480 on December 26, 1950 and as claimed therein.

At the same time, as the transducing arm is lowered into operating contact at the initiation of a transducing operation, the sensing member 1—38 of limit switch 1—86 is inwardly actuated by contact with the upper surface of the guide disc and may be connected in the driving motor supply line to automatically energize the driving motor and begin the transducing. Rotation of the turntable and guide disc causes the guide pin 1—76 to follow the guide channel 1—99, thereby causing the pole faces 1—70 to trace a spiral path over the record member 1—31. The switch 1—86 is so arranged that when the transducing operation is about finished, sensing member 1—88 carried outwardly by the transducing arm is brought beyond the edge of the guide disc 1—90 permitting the downwardly biased sensing member to move downwardly opening the energizing circuit of the drive motor 1—42 and promptly stopping the transducing.

The interrupting switch 1—86 may be interconnected so that it opens the energizing circuit for the turntable driving motor which may be of the standard low power A. C. induction type. In addition to opening the energizing circuit to the conventional A. C. power supply, the switch 1—86 may simultaneously close a D. C. power supply circuit to the motor windings. As explained in the copending Dank application Ser. No. 690,878 filed August 16, 1946, which issued as Patent 2,535,486 on December 26, 1950, a passage of direct current through the windings of such a motor establishes a braking action which rapidly decelerates the motor shaft and quickly brings it to a halt. The D. C. power may be supplied through a simple filtering condenser circuit.

As shown in Fig. 6, the boss 1—96 is formed as a separate tube flanged at one end as shown at 1—70. The flanges are secured around a central opening in the retaining plate 1—85 as by welding. The dished turntable surface may be shaped to also accommodate the flanges 1—70 of the record supporting plate boss. Alternatively, the boss 1—96 may have its flanges 1—70 secured in place against the upper surface of the record supporting plate 1—85, the central opening 1—51 of the record member being suitably enlarged. A layer of flock or felt (not shown) on the upper surface of the turntable provides the substantially non-slip driving connection to the record holding unit. It also compensates to some extent for minor variations in the thickness of the record supporting plate effecting additional driving engagement between the turntable and the record portions extending beyond the supporting plate.

Figure 7:
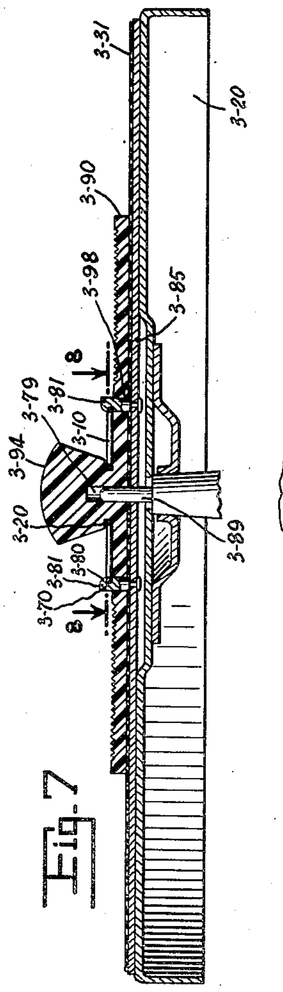
Fig. 7 is a view similar to Fig. 6 of a modified record supporting structure of the invention.
Figure 8:
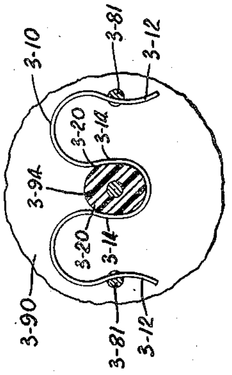
Fig. 8 is a sectional view of the construction of Fig. 7 taken along line 8—8.

Figs. 7 and 8 show a further form of the invention. In this construction the record supporting plate 3—85 has a diameter at least as large as that of the record member 3—31. The guide structure 3—90 is aligned and held to the record supporting plate 3—85 by means of aligning pins 3—81, shown as separate members attached to the plate by riveting over reduced extensions fitted through apertures in the plate. The riveted-over portions may be countersunk in the body of the plate to provide a smoother unit more easily handled. The pins 3—81 constitute latching elements for directly holding the plate 3—85 in effective engagement with the guide structure 3—90 and properly retaining the record member 3—31 in place. As shown in the figure, the aligning pins are notched as indicated at 3—70 and tapered at 3—80 to provide a latching region adjacent the upper ends of their inner faces. A latch spring 3—10 is held on the guide structure 3—90 and includes outwardly biased arms 3—12 which may be formed of wire for engagement with the notches 3—70 when the unit is assembled. The tapering faces 3—80 are arranged so that when the guide structure is lowered over the aligning pins 3—81, the outwardly biased arms 3—12 are automatically flexed inwardly permitting the penetration of the pins through aligned sockets 3—98. When the fully assembled position is reached the spring arms 3—12 move outwardly into the latched notches 3—70. The components are thereby united together and ready for use. The unit may be manipulated by means of a grip knob 3—94 forming part of the guide structure 3—90. This knob may also be provided with a socket 3—79 for receiving a central pivot pin 3—89 of the turntable 3—29. The recording unit including the assembled record supporting plate 3—85, guide structure 3—90 and sandwiched record member 3—31 may be mounted on the turntable by fitting the socket 3—79 over the turntable pin 3—89 as shown in Fig. 7. The grip knob 3—94 is also used for manually removing the assembled unit when the transducing operation is completed. An additional record member may then be substituted as by replacing it with a substitute record member previously sandwiched and held between an additional record plate 3—85 and guide structure 3—90.

For disassembling the unit and removing the record track 3—31, as when it is desired to store it in a minimum amount of space and in compact form, the latch engagement between the record supporting plate and the guide structure is opened. This is easily effected by squeezing the two spring arms 3—12 together, as by the thumb and the forefinger of one hand. Simultaneous lifting of the guide structure will bring it away from the supporting plate 3—85. If desired, added urging of the aligning pins 3—81 or the extended periphery of the plate or record track will facilitate the separation. The record member 3—31 may then be easily removed from the plate and replaced by another.

In the form shown in Figs. 7 and 8, the catch spring 3—10 is held in place in one or more outwardly facing notches 3—20 in the guide structure 3—90. The intermediate portions of the catch spring 3—10 may be generally U shaped to provide transverse legs 3—14 inwardly biased toward each other for securely holding them in the notches 3—20. The notches are also so shaped with respect to the catch spring that the spring can be simply pushed into place by sliding it transversely around the notches 3—20 so that it is automatically held in the position shown in Fig. 8 with the outer arms 3—12 suitably aligned for engagement with the pins 3—81.

The supporting plate 3—85, in the form shown in Fig. 7, may be of any suitable overall diameter and may also extend beyond the edges of the turntable 3—20 to provide an additional record track space not otherwise available. Thus, the diameter of the supporting plate may be two or three inches larger than that of the turntable so that when used with a correspondingly sized record member 3—31 and a suitably dimensioned guide structure, an additional annular record receiving surface of the record track about one inch wide is provided.

As an alternative construction, the latching arrangement of the record track holding unit of Fig. 6 may be used with a supporting plate of the larger size described above in connection with Fig. 7, and if desired the latching arrangement shown in Fig. 7 may be applied to the smaller form of plate structure shown in Fig. 6. Other record-holding constructions may be used in the apparatus of the invention.

Figure 9:
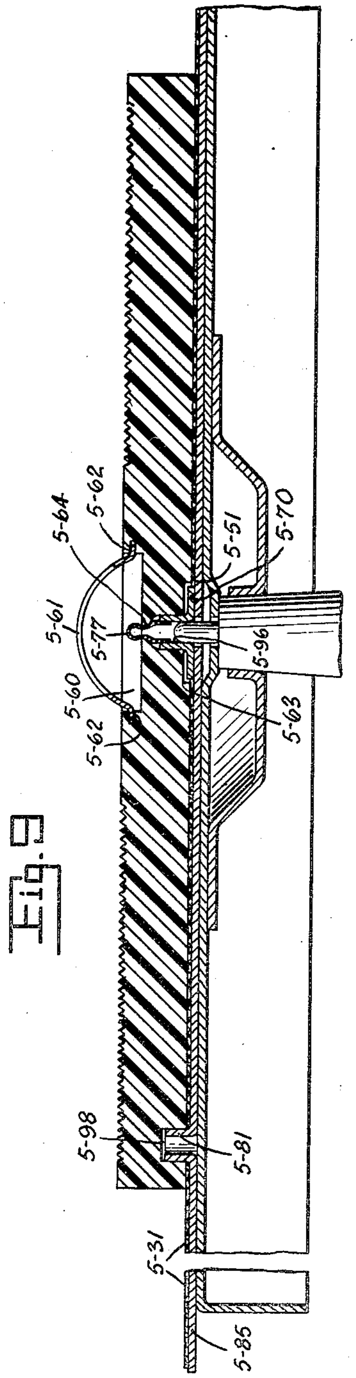
Fig. 9 is a sectional view similar to Fig. 6 of a different embodiment of record supporting structure according to the invention.

Fig. 9 shows a further construction according to the invention in which the record supporting structure is adapted for convenient stacking in piles so that a relatively large number may be securely stored in a small space. In this form the guide track member, which is generally similar to the guide track member of Figs. 2 and 6 is provided with a central well 5—60 in which is mounted a lifting attachment, such as the bail handle 5—61. The bail may be of wire-like construction having ends 5—62 held in sockets in the recessed well in which the bail is pivotally held. As shown in the figure, the bail handle 5—61 is rotated to the upwardly projecting position in which it can be readily gripped by the fingers for manipulating the record supporting structure as a unit, or the guide track member by itself. For stacking purposes, the bail handle 5—61 may be rotated to the generally horizontal position in which it lies in the well 5—60, leaving the upper surface of the guide structure generally flat. The guide track member is shown as containing only an aligning socket 5—98 for receiving an aligning projection 5—81 punched upwardly from the record sheet retaining member 5—85 in a manner similar to that described in connection with Figs. 2 and 6. A central boss 5—96 is secured around the central opening in the retaining plate 5—85, and, as shown, has horizontally extending flanges 5—70 secured as by welding to the upper surface of plate 5—85, leaving the lower surface of the plate 5—85 in generally flat condition without protuberances. Interlocking engagement between the retaining plate and the guide track structure may be provided by a catch spring 5—77 on the central boss 5—96 cooperating with a constricted neck 5—64 of the central bore of the guide track structure so proportioned that when assembled the uppermost portions of the central boss do not project above the generally flat surface of the track structure. To accommodate the extra thickness of the retaining member 5—85 where the flanges 5—70 are secured, the lower surface of the track structure may be recessed as indicated at 5—63.

In the form of the invention shown in Fig. 9, a limp disc-like record sheet structure 5—31 has a central opening 5—51 large enough to permit it to lie flat on the retaining plate 5—85. The operation of this construction is otherwise quite similar to those described above. The components of the record sheet holder unit are easily snapped into place by merely pushing them together after they are aligned. They are also easily separated by gripping the bail handle 5—61 and lifting while at the same time pushing downwardly on the projection of the central boss, which, as shown, extends into operative position above the floor of the well 5—60. The bail handle may, if desired, be replaced by an integrally molded portion of the guide track structure which is sufficiently recessed to permit stacking. In either form, the record holding units may be so shaped that when stacked portions of one unit fit into and engage portions of an overlying unit so that the units of a stack are not free to slide away and make it unstable. This is easily provided by suitably shaping the upper end of the central boss 5—96 to penetrate and fit within the lower end of the opening in the central boss of the unit resting upon it in the stack. The entire stack is thereby effectively keyed into a stable form.

Other record holding constructions may be used in the apparatus of the invention. Thus, for example, magnetic or friction forces may be used for securely holding the record sheet in place in the holder unit. One or both of the record holding members, such as the guide structure, may include permanent magnet portions positioned for magnetically holding magnetic portions provided in the other member, the supporting plate, for example. The permanent magnet in one such exemplification is formed in the general shape of a ring surrounding the central socket of the guide structure knob. A central post extending up from the supporting plate, as in the construction of Fig. 6, is provided with magnetic portions so that when fitted into place in the guide structure socket the magnetic portions of the post lie very close to the magnet portions surrounding the socket and are strongly attracted and held in place. The magnetic portions are also arranged to provide a definite vertical clamping force to the record sheet as by so locating them on their respective members that in the fully assembled position the portions are just brought just short of vertical alignment, the guide disc magnetic portions peing a little higher than the support post magnetic portions. The magnet or magnets are so polarized that generally vertical adjacent faces of one or both of the magnetic portions constitute magnet poles, thereby urging the magnetic portions closer together and supplying sufficient clamping force to keep the record sheet firmly sandwiched in place. The supporting plate post may also extend up through and project from the top of the grip knob permitting ready separation of the holder unit into its components by holding the knob and pushing down on the projecting post top, as in the construction of Figs. 2 and 6.

Permanent magnet portions may be provided in the guide structure by incorporating in the molded grip knob portion a localized concentration of magnetic iron oxides or permanently magnetizable metal either in finely divided or in massive form. The post may be provided with permanent magnet portions by making it hollow and of non-magnetic material, with a magnetic body imbedded within it and held in place. The walls of the hollow post may be cut away to receive lateral extensions of the imbedded magnet which is thereby brought into closer magnetic linkage with the magnetic portions of the guide structure.

With the above construction, either of the magnetic portions may be of a low retentivity not permanently magnetizable composition. With any of the described magnetic constructions, the clamping magnetic flux is so distributed that in normal use it has no effect on the annular regions of the magnetizable record sheet in which signal recordings are magnetically retained. The magnetic members are so recessed in their holders that their magnetic fields do not extend to the externally projecting elements of the guide structure or the supporting plate structure so that no matter how these structures are brought into contact with the record sheet the magnetic portions cannot be made to approach the recording portion of the record sheet closely enough to magnetically affect it.

As a further modification, friction clamping forces may be utilized to keep the record-holding unit together. Thus in place of the magnetic portions described above, the record support post and/or the grip-knob socket may be tapered so that when mounted they are wedged together to keep them in place, and for disassembling they may be easily forced apart.

Figure 10:
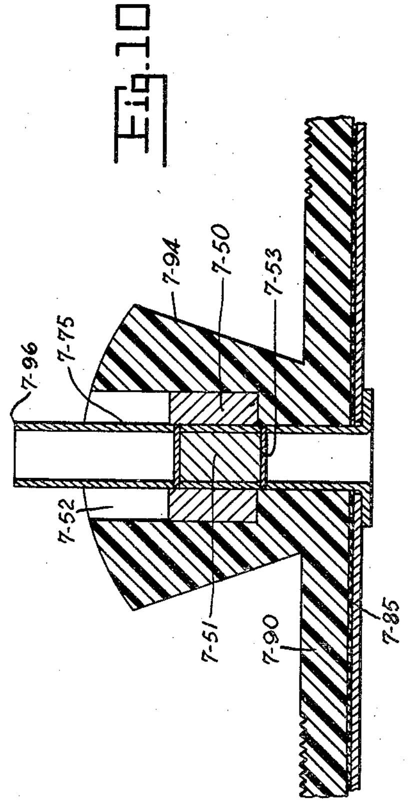
Fig. 10 is an enlarged view with parts broken away of some of the details of another exemplification of the invention.

Fig. 10 shows one form of magnetic holding arrangement for securely uniting a guide track structure 7—90 with a retaining plate structure 7—85. The guide track structure, which may be generally similar to that shown in Figs. 2 and 6, is shown as having a magnetic ring 7—50 imbedded around a central bore region 7—75 cooperating with another magnetic member 7—51 held in the central boss 7—96 projecting from the retaining plate 7—85. Either or both of the magnetic members 7—50, 7—51 may be of the permanent magnet type which attracts the other and supplies sufficient force to securely hold a sandwiched limp record sheet in place. The magnetic members 7—50, 7—51 are so positioned that in the fully engaged position of the record sheet holding members, the magnetic attracting forces have sufficient vertical components to securely hold them together. The magnetic ring 7—50 may be mounted by providing a closely fitting counter bore 7—52 in the grip-knob portion 7—94 through which it can be forced into place. The magnetic slug 7—51 may be held in post 7—96 between pins 7—53 extending through the walls of the post above and below the slug. The pins 7—53 may also be formed of magnetic material so as to diminish the non-magnetic gap distance between the magnetic members 7—50, 7—51 and heighten the clamping forces. The magnetic members may be magnetically polarized so that the inner face of the ring has the magnetic poles at its upper and lower borders, and the slug 7—51 may be polarized generally longitudinally in a vertical direction. The upper end of the boss 7—96 is arranged to project above the grip-knob 7—94 by a distance sufficient to permit manual lowering of the post with respect to the knob through a distance large enough for the magnetic members to be substantially separated, reducing their attraction to very low values and permitting the retaining plate 7—85 to fall out under the action of its own weight. In that form of the invention in which both magnetic members 7—50, 7—51 are permanently magnetized, the lowering of the slug 7—51 to bring its upper pole to the level of the lower pole of the magnetic ring 7—50 will result in the generation of magnetic repulsion forces assisting in the disassembling of the unit.

Alternatively, either of the magnetic portions may be of a low retentivity not permanently magnetizable composition. With any of the described magnetic constructions, the clamping magnetic flux is so distributed that in normal use it has no effect on the annular regions of the magnetizable record sheet in which signal recordings are magnetically retained. Bringing any part of the guide structure or the supporting plate into contact with the record sheet cannot cause the magnetic clamping portions to approach the recording portion of the record sheet closely enough to magnetically affect it.

The expression "magnetic record transducing" as used herein in the specification and claim is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claim they shall not be limited to the specific exemplifications of the invention described herein.

I claim:

In a magnetic record transducing system operating with a revolvable turntable and in which a spiral guide track revolved by the turntable actuates a guide stylus of a magnetic transducer head to guide the transducer head along an intangible record trace on an exposed magnetic record surface revolved by the turntable; a self-supporting generally flat guide disc having on its top surface said spiral guide track and including a centrally positioned upstanding grip-knob; a limp magnetizable disc in engagement with the bottom surface of said guide disc and extending beyond the peripheral edge of said guide disc; retaining plate means one face of which is in engagement with the bottom surface of said magnetizable disc and the other face of which is adapted to engage the top surface of said turntable and including a substantially centrally located boss on said retaining plate extending through said magnetizable disc and through said guide disc; and detachable latching means securing said boss to said guide disc whereby when secured together said guide disc, said magnetizable disc and said retaining plate form a self-supporting interconnected unit with said limp magnetizable disc supported from above by said guide disc and below by said retaining plate so that said unit may be quickly and easily put onto or taken off from said revolvable turntable as a unit, and whereby when said latching means are actuated by the operator said guide disc and said retaining plate may be separated to release the magnetizable disc.

JOHN H. ROUSE.

REFERENCES CITED

The following references are of record in the file of this patent:

UNITED STATES PATENTS

| Number | Name | Date |
|---|---|---|
| 2,078,113 | Zecha | Apr. 20, 1937 |
| 2,489,685 | Sultan | Nov. 29, 1949 |

FOREIGN PATENTS

| Number | Country | Date |
|---|---|---|
| 706,826 | France | June 30, 1931 |
| 721,844 | France | Mar. 8, 1932 |
| 613,925 | Germany | May 29, 1935 |